US007039675B1

(12) United States Patent
Kato

(10) Patent No.: US 7,039,675 B1
(45) Date of Patent: May 2, 2006

(54) DATA COMMUNICATION CONTROL APPARATUS AND METHOD ADAPTED TO CONTROL DISTRIBUTION OF DATA CORRESPONDING TO VARIOUS TYPES OF A PLURALITY OF TERMINALS

(75) Inventor: Masami Kato, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/343,183

(22) Filed: Jun. 30, 1999

(30) Foreign Application Priority Data

Jul. 6, 1998  (JP)  ................................ 10-190748

(51) Int. Cl.
G06F 15/16   (2006.01)
G06F 15/173  (2006.01)

(52) U.S. Cl. ............... 709/204; 709/205; 709/218; 709/238; 709/246

(58) Field of Classification Search ........ 709/204–207, 709/217–219, 206, 271; 345/733–747; 370/260, 370/401; 704/275, 271
See application file for complete search history.

(56) References Cited

U.S. PATENT DOCUMENTS

| 5,673,080 | A | * | 9/1997 | Biggs et al. |
| 5,673,205 | A | * | 9/1997 | Brunson ...................... 725/114 |
| 5,774,857 | A | * | 6/1998 | Newlin ........................ 704/271 |
| 5,841,977 | A | * | 11/1998 | Ishizaki et al. ............. 709/204 |
| 5,848,134 | A | * | 12/1998 | Sekiguchi et al. ....... 379/93.15 |
| 5,872,923 | A | * | 2/1999 | Schwartz et al. ........... 709/205 |
| 5,884,262 | A | * | 3/1999 | Wise et al. .................. 709/219 |
| 5,991,276 | A | * | 11/1999 | Yamamoto .................. 370/260 |
| 5,991,723 | A | * | 11/1999 | Duffin ......................... 704/275 |
| 5,995,490 | A | * | 11/1999 | Shaffer et al. .............. 370/260 |
| 6,020,915 | A | * | 2/2000 | Bruno et al. ........... 379/202.01 |
| 6,078,350 | A | * | 6/2000 | Davis ....................... 348/14.08 |
| 6,100,882 | A | * | 8/2000 | Sharman et al. ............ 709/206 |
| 6,122,259 | A | * | 9/2000 | Ishida ......................... 370/260 |
| 6,124,880 | A | * | 9/2000 | Shafiee .................... 348/14.08 |
| 6,173,250 | B1 | * | 1/2001 | Jong |
| 6,195,358 | B1 | * | 2/2001 | Bowater et al. ............ 370/401 |
| 6,249,787 | B1 | * | 6/2001 | Schleimer et al. .......... 709/218 |
| 6,262,978 | B1 | * | 7/2001 | Bruno et al. ................ 370/260 |
| 6,356,283 | B1 | * | 3/2002 | Guedalia |
| 6,404,747 | B1 | * | 6/2002 | Berry et al. |
| 6,707,434 | B1 | * | 3/2004 | Wilson ....................... 709/247 |

FOREIGN PATENT DOCUMENTS

| JP | 05007356 A | * | 1/1993 |
| JP | 09191455 A | * | 7/1997 |
| JP | 09233444 A | * | 9/1997 |
| JP | 10243389 A | * | 9/1998 |
| JP | 10257424 A | * | 9/1998 |

* cited by examiner

*Primary Examiner*—Rupal Dharia
*Assistant Examiner*—Quang N. Nguyen
(74) *Attorney, Agent, or Firm*—Fitzpatrick, Cella, Harper & Scinto

(57) ABSTRACT

In a conventional multipoint videoconferencing system, one can take part in the conference only from an H.320-compliant dedicated communication terminal. According to the present invention, a general-purpose terminal is connected to a multipoint videoconferencing system via the Internet and video from a communication terminal is converted to HTML data, which is then distributed to the general-purpose terminal. Voice communication between the communication terminal and general-purpose terminal is made possible by making a suitable conversion between the voice communication protocols of the two terminals. As a result, even a transportable general-purpose terminal, for example, can participate in videoconferencing.

15 Claims, 7 Drawing Sheets

DATA COMMUNICATION CONTROL APPARATUS AND METHOD ADAPTED TO CONTROL DISTRIBUTION OF DATA CORRESPONDING TO VARIOUS TYPES OF A PLURALITY OF TERMINALS

BACKGROUND OF THE INVENTION

This invention relates to a data communication control apparatus and method for implementing a multipoint videoconferencing system by controlling the communication of video and audio signals among a plurality of terminals. The invention relates also to a data communication system that includes this data communication control apparatus.

Multipoint videoconferencing systems that are currently proliferating make it possible for videoconferencing terminals in compliance with the standard of ITU-T Recommendation H.320 to communicate with one another from multiple locations.

ITU-T Recommendation H.231, which defines the functional framework of multipoint connection devices and the form of multipoint communications, and ITU-T Recommendation H.243, which establishes an in-channel communications procedure, have been set up as standards relating to multipoint connection equipment for controlling the connections at the multiple locations of videoconferencing terminals.

FIG. 6 is a block diagram illustrating the configuration of a multipoint videoconferencing system according to the prior art. The system includes a multipoint connection apparatus 122 compliant with H.231 and H.234, and videoconferencing terminals 121 compliant with H.320. The multipoint connection apparatus 122 interconnects the videoconferencing terminals 121 located at three or more points and supervises audio mixing, distribution of video data or multiple-screen synthesis of video data and chairperson control for facilitating conferencing. Thus, if the videoconferencing terminals are in compliance with H.320, a multipoint video conference connecting a plurality of remote locations can be realized by connecting the terminals via the multipoint connection apparatus.

However, an H.320-compliant videoconferencing terminal is very expensive because it is a dedicated terminal that necessitates high-load signal processing such as the compression and decompression of video data (ITU-T Recommendations H.261, H.263, etc.). Accordingly, it is difficult to realize a low-cost, low-power-consumption terminal that is capable of participating in videoconferencing, and to make such a terminal portable.

As a consequence of the foregoing, only a dedicated terminal can participate in conventional multipoint videoconferencing. In other words, a user can participate in conferencing only from a location at which a dedicated terminal has been installed.

In order to solve this problem, it has been proposed to provide the conventional multipoint connection apparatus not only with the function for interconnecting H.320-compliant videoconferencing terminals but also with a so-called voice gateway function that makes possible participation in a multipoint videoconferencing system by ordinary telephone.

FIG. 7 is a block diagram showing the configuration of a multipoint videoconferencing equipped with a telephone-based voice gateway function. As shown in FIG. 7, a plurality of dedicated videoconferencing terminals 131 and an ordinary telephone 133 are connected by a multipoint connection apparatus 132. In this system it is possible for the ordinary telephone 133 to participate in a multipoint video conference by voice only.

In a multipoint videoconferencing system of the kind illustrated in FIG. 7, it is possible to participate in a conference from an ordinary telephone but a sufficiently realistic sense of conference participation is not obtained merely by telephone-based voice. In addition, since participation in a conference from a telephone is limited to audio, naturally it is impossible to participate in data conferencing in accordance with ITU-T Recommendation T.120.

SUMMARY OF THE INVENTION

Accordingly, it is an object of the present invention to provide a data communication control apparatus and method, as well as a data communication system, in which participation in a multipoint video conference by voice is possible from a general-purpose terminal.

According to the present invention, the foregoing object is attained by providing a data communication control apparatus for controlling data communication among a plurality of connected communication terminals, comprising: connecting means for connecting a general-purpose terminal; image generating means for generating image data that conforms to the general-purpose terminal; image distributing means for distributing the image data, which has been generated by the image generating means, to the general-purpose terminal via the connecting means; audio converting means for converting format of audio data in order that the audio data may be communicated mutually between the general-purpose terminal and the plurality of communication terminals; and audio distributing means for distributing the audio data, whose format has been converted by the audio converting means, to the communication terminals and/or general-purpose terminal.

As a result, it is possible to view images and to communicate by voice with a communications terminal at a general-purpose terminal. Participation in a video conference from a general-purpose terminal thus becomes feasible.

Another object of the present invention is to provide a data communication control apparatus and method, as well as a data communication system, in which participation in a multipoint video conference by text chat is possible from a general-purpose terminal.

According to the present invention, the foregoing object is attained by providing a data communication control apparatus for controlling data communication among a plurality of connected communication terminals, comprising: connecting means for connecting a general-purpose terminal; image generating means for generating image data that conforms to the general-purpose terminal; image distributing means for distributing the image data, which has been generated by the image generating means, to the general-purpose terminal via the connecting means; voice recognition means for recognizing voice data that has entered from the communication terminals and generating text data based upon this recognition; and data distributing means for distributing the text data to the general-purpose terminal.

As a result, it is possible to view images and to engage in a text chat with a communications terminal at a general-purpose terminal. Participation in a video conference from a general-purpose terminal thus becomes feasible.

Another object of the present invention is to provide a data communication control apparatus and method, as well as a data communication system, in which participation in a conference by text chat is possible from a general-purpose terminal even in a case where a dedicated communication terminal in a multipoint video conference is not equipped with a data conferencing function.

According to the present invention, the foregoing object is attained by providing a data communication control apparatus for controlling data communication among a plurality of connected communication terminals, comprising: connecting means for connecting a general-purpose terminal; image generating means for generating image data that conforms to the general-purpose terminal; image distributing means for distributing the image data, which has been generated by the image generating means, to the general-purpose terminal via the connecting means; voice recognition means for recognizing first voice data that has entered from the communication terminals and generating text data based upon this recognition; data distributing means for distributing the text data to the general-purpose terminal; voice synthesizing means for synthesizing second voice data based upon text data that has entered from the general-purpose terminal; and audio distributing means for distributing the second voice data to the communication terminals.

As a result, text data that as been entered from a general-purpose terminal is distributed to communications terminals as synthesized voice. Participation in a video conference from a general-purpose terminal thus becomes feasible.

The invention is particularly advantageous in that a general-purpose terminal can participate in a multipoint videoconferencing system in a simple manner.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention

DESCRIPTION OF THE PREFERRED EMBODIMENTS

Preferred embodiments of the present invention will now be described in detail in accordance with the accompanying drawings.

First Embodiment

Figure 1:
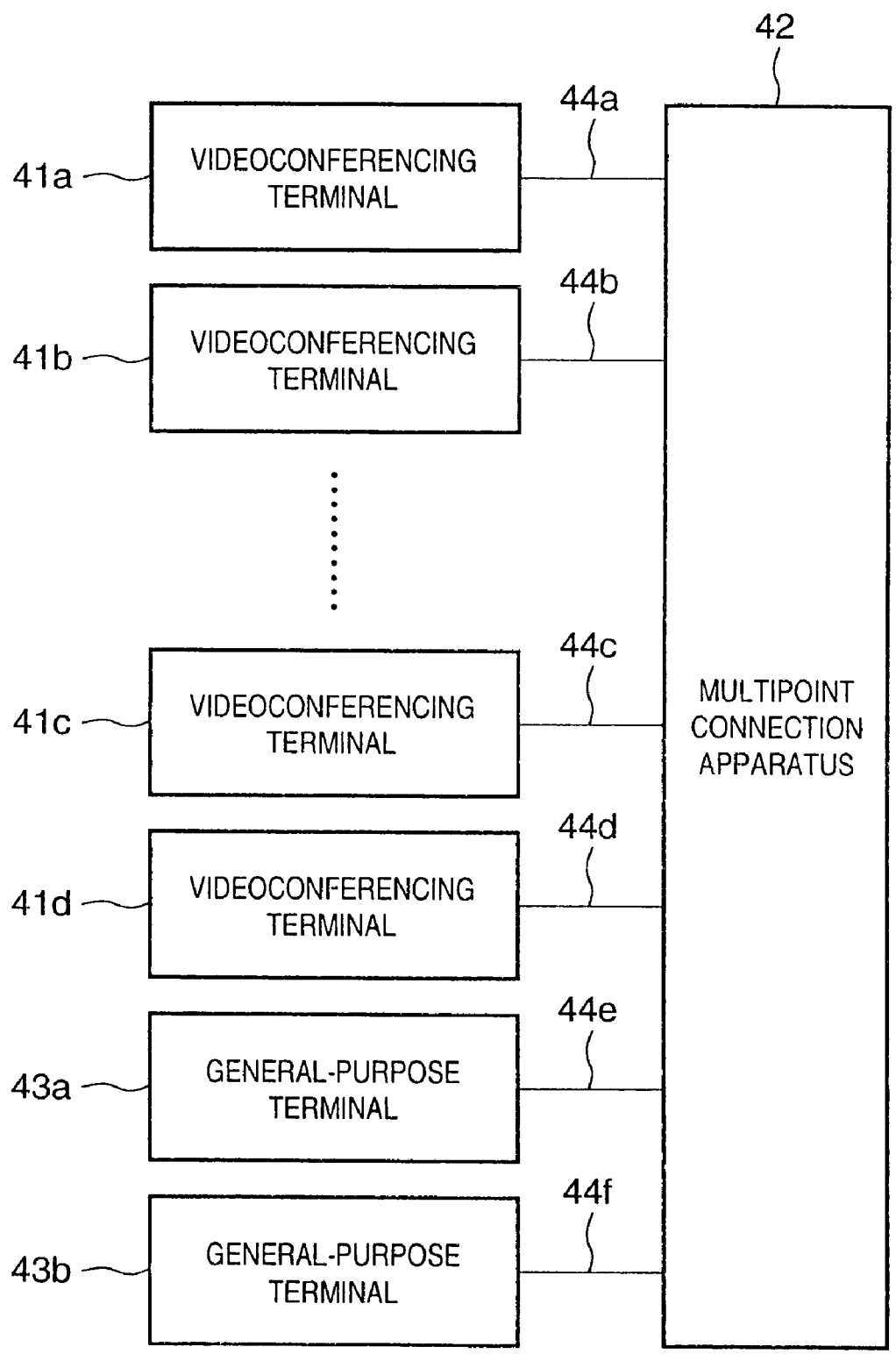
FIG. 1 is a block diagram illustrating a multipoint videoconferencing system according to a first embodiment of the present invention.

FIG. 1 is a block diagram illustrating the basic configuration of a multipoint videoconferencing system according to a first embodiment of the present invention. As shown in FIG. 1, the system includes dedicated videoconferencing terminals 41*a* to 41*d*, which are terminals in compliance with the standards relating to videoconferencing stipulated by ITU-T Recommendations H.320, H.323 and H.324, etc., a videoconferencing multipoint connection apparatus 42 which, in addition to the functions relating to a conventional multipoint connection apparatus, also has a function for automatically generating HTML (HyperText Markup Language) data and an HTTP (HyperText Transfer Protocol) server function.

The system further includes general-purpose communication terminals 43*a*, 43*b*. Data such as video and audio that has been stored in the HTTP server within the multipoint connection apparatus 42 can be displayed or converted to sound by the general-purpose communication terminals 43*a*, 43*b*. Personal computers or network computers incorporating a so-called WWW browser are applicable as the general-purpose communication terminals 43*a*, 43*b*. Recent progress in semiconductor technologies also makes it possible to use simpler transportable terminals.

Lines 44*a* to 44*f* connect the terminals to the multipoint connection apparatus 42. A public network such as an ISDN or PSTN and a LAN (Local Area Network) such as the Ethernet are applicable. It is assumed here that the general-purpose communication terminals 43*a*, 43*b* are connected to the multipoint connection apparatus 42 via the lines 44*e*, 44*f*, respectively, in accordance with the IP (Internet Protocol).

Thus, in this embodiment, the already existing videoconferencing terminals 41*a* to 41*d* and the general-purpose communication terminals 43*a*, 43*b* such as personal computers or network computers are interconnected by simple means.

Figure 2:
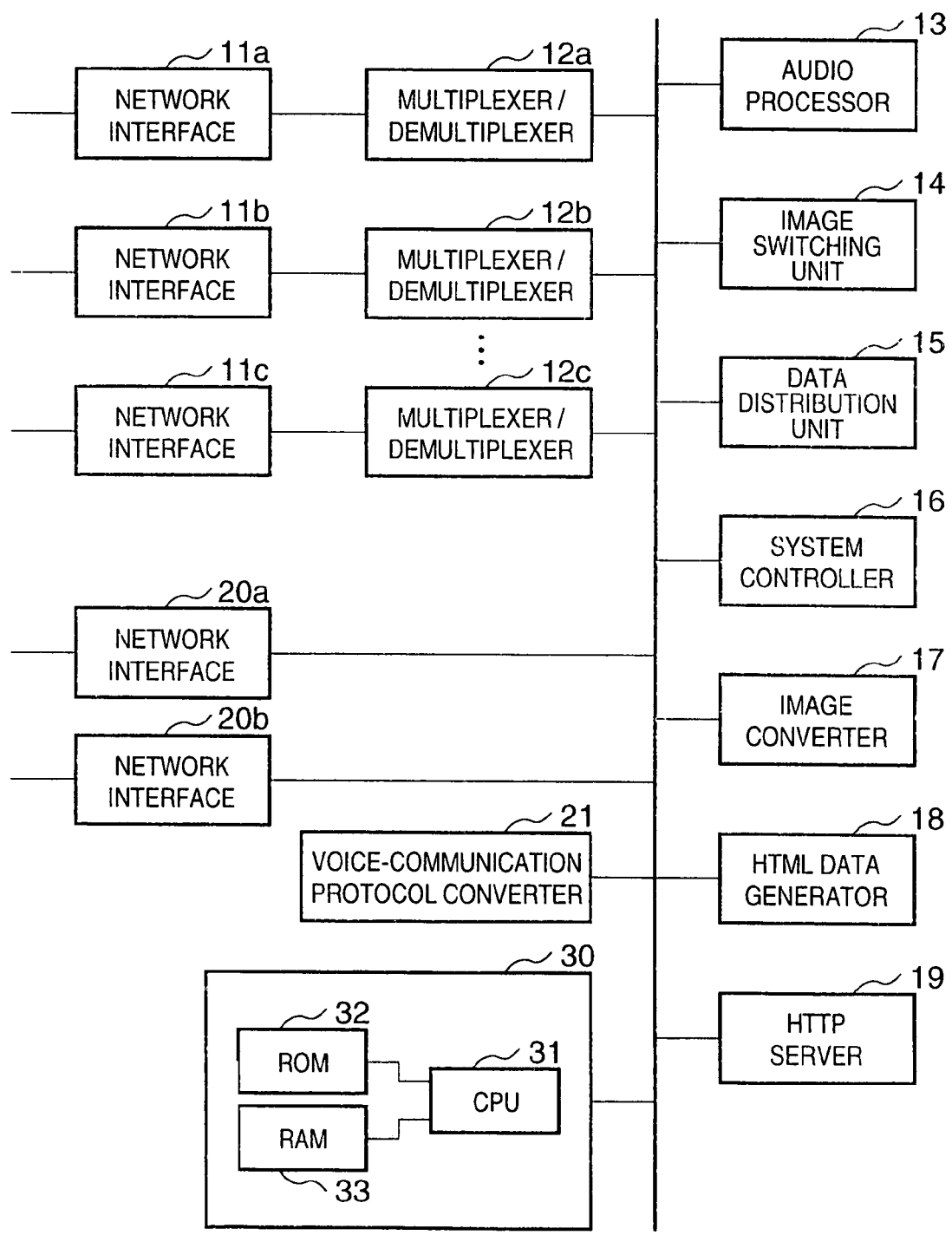
FIG. 2 is a block diagram showing the construction of a multipoint connection apparatus in the system of FIG. 1 according to this embodiment.

FIG. 2 is a block diagram showing the details of the multipoint connection apparatus 42 according to this embodiment. As shown in FIG. 2, the apparatus includes network interface units 11*a* to 11*c* through which the videoconferencing terminals 41*a* to 41*d* are accommodated in this system. These units supervise line interfaces of an ISDN or PSTN, etc. Multiplexer/demultiplexers 12*a* to 12*c* apply multiplex/demultiplex processing to various data relating to images, voice and control, etc. The multiplexer/demultiplexers 12*a* to 12*c* are in compliance with H.221, by way of example. The number of network interfaces and multiplexer/demultiplexers in the multipoint connection apparatus 42 correspond to the number of dedicated videoconferencing terminals capable of being connected to the multipoint connection apparatus 42.

Network interface units 20*a*, 20*b* are for connecting general-purpose terminals. As in the manner of the network interface units 11*a* to 11*c* for the dedicated videoconferencing terminals, these network interface units supervise interfaces of a public network, such an ISDN or PSTN, etc., or interfaces of a LAN such as the Ethernet.

An audio processor 13 applies decoding/mixing processing to audio code data from the dedicated videoconferencing terminals 41a to 41d, thenceforth encodes the data again and distributes it to each of the dedicated videoconferencing terminals 41a to 41d and to a voice-communication protocol converter 21. An image switching unit 14 selectively switches among image signals, which are distributed to the dedicated videoconferencing terminals 41a to 41d, in accordance with a control signal issued by a chairperson terminal, by way of example. A data distribution unit 15 executes processing for distributing T.120-compliant data conferencing data, etc. A system controller 16 carries out overall control of the system. An image converter 17 generates still pictures by decompressing moving-picture code data that has been demultiplexed by the multiplexer/demultiplexers 12a to 12c.

An HTML data generator 18 converts, to HTML files, still pictures generated by the image converter 17 and various information relating to videoconferencing in this system. An HTTP server 19 provides various videoconferencing information generated by the HTML data generator 18 to the general-purpose communication terminals 43a, 43b connected to the multipoint connection apparatus 42.

The voice-communication protocol converter 21 performs mutual conversion of encoding methods and protocols in order to realize mutual communication of audio data among the videoconferencing terminals 41a–41d and general-purpose communication terminals 43a, 43b connected to the multipoint connection apparatus 42.

A controller 30 has a CPU 31, a ROM 32 and a RAM 33. The CPU 31 performs overall control of the above-mentioned components in accordance with a control program stored in the ROM 32. The RAM 33 is used as the working area of the CPU 31.

The operation of the multipoint connection apparatus 42 in the videoconferencing system of this embodiment will be described in detail with reference to FIG. 2.

Multimedia multiplexed data that has been sent to the multipoint connection apparatus 42 via the dedicated network interfaces 11a to 11c accommodating the videoconferencing terminals 41a to 41d is demultiplexed to audio code data, video code data and low-speed data for data conferencing by the multiplexer/demultiplexers 12a to 12c. The demultiplexed audio code data is decoded by the audio processor 13 and mixed with data obtained by decoding other audio code data that has been demultiplexed by any of the multiplexer/demultiplexers 12a to 12c.

It should be noted that audio code data enters the multipoint connection apparatus 42 also from the general-purpose communication terminals 43a, 43b via the network interfaces 20a, 20b. This audio code data is subjected to a protocol conversion by the voice-communication protocol converter 21 so as to conform to the videoconferencing terminals 41a to 41d. The audio processor 13 decodes the protocol-converted audio code data from the general-purpose terminals 43a, 43b, mixes this data with decoded data obtained by decoding the audio code data from the videoconferencing terminals 41a to 41d and then encodes the results.

The mixed audio code data is multiplexed with image data in the multiplexer/demultiplexers 12a–12c and the multiplexed data is distributed to the dedicated videoconferencing terminals 41a–41d. At the same time, the mixed audio code data is converted to a prescribed protocol by the voice-communication protocol converter 21, after which the resulting data is sent to the general-purpose terminals 43a, 43b via the network interfaces 20a, 20b.

Mutual communication of audio data is performed in real-time between the general-purpose communication terminals 43a, 43b and the multipoint connection apparatus 42 by RTP (Real-Time Transfer Protocol) of the IP. That is, the voice-communication protocol converter 21 performs a mutual conversion between the Internet protocol and the videoconferencing protocol in relation to the audio data.

Among the various items of video code data demultiplexed by the multiplexer/demultiplexers 12a to 12c, the video code data from a terminal designated by the image switching unit 14 is sent to the multiplexer/demultiplexers 12a to 12c, whence the data is distributed to the videoconferencing terminals 41a to 41d. The video code data demultiplexed by the multiplexer/demultiplexers 12a to 12c is sent also to the image converter 17 at the same time. The image converter 17 decodes the coded video data and converts one frame of video data to a still picture. The still picture obtained by the conversion is compressed by an encoding method stipulated by the JPEG (Joint Photographic Experts Group), by way of example.

The HTML data generator 18 generates HTML data based upon the still picture from each terminal generated by the image converter 17 and information relating to videoconferencing. The HTTP server 19 provides the HTML data generated by the HTML data generator 18 to the general-purpose communication terminals 43a, 43b, which possess an HTML viewer function, connected to the network interfaces 20a, 20b.

Figure 3:
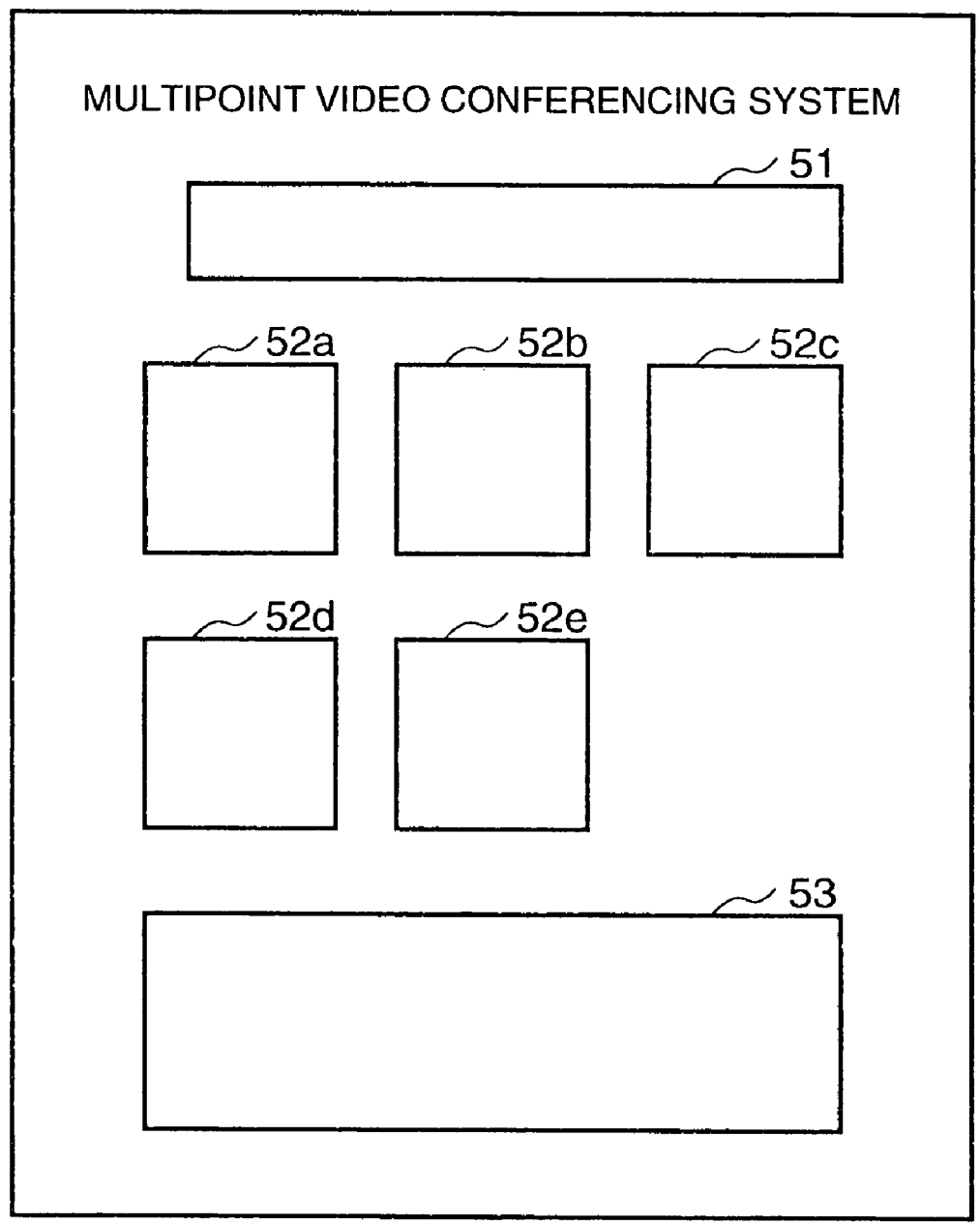
FIG. 3 is a diagram showing an example of the structure of HTML data in this embodiment.

FIG. 3 illustrates the manner in which HTML files generated by the HTML data generator 18 are perused by an HTML viewer. As shown in FIG. 3, a window 51 indicates information relating to a videoconference. By way of example, the window 51 presents conference starting time and information relating to participants. Windows 52a to 52e display still pictures generated by the image converter 17, e.g., still pictures of the participants taking part in the conference by each of the terminals. A window 53 is for T.120-compliant data conferencing. This window displays text chat, shared applications, etc.

Thus, in accordance with this embodiment, as described above, the user of a general-purpose terminal connected to a network interface via a network is enabled, by an IP-related protocol such as RTP, to perform voice communication with other dedicated videoconferencing terminals and is also enabled to peruse video from a dedicated videoconferencing terminal as a still picture by utilizing an HTML viewer.

Further, an ordinary personal computer or network computer having an audio input/output function can be employed as the general-purpose terminal that implements the above functions. As a result, a person can participate in a conventional multipoint video conference from any location via an ordinary telephone line and it also becomes readily feasible to participate in a conference from a transportable terminal.

Second Embodiment

A second embodiment according to the present invention will now be described.

Since the basic configuration of the videoconferencing system according to the second embodiment is similar to that shown in FIG. 1, which illustrates the first embodiment, it need not be described again here. The multipoint connection apparatus 42 according to the second embodiment, besides having the functions relating to the conventional multipoint connection apparatus, is provided not only with the function for automatically generating HTML data and the HTTP server function but also with a function through which the content of a conversion with a person speaking at a conference is converted to text by a voice recognition mechanism.

Figure 4:
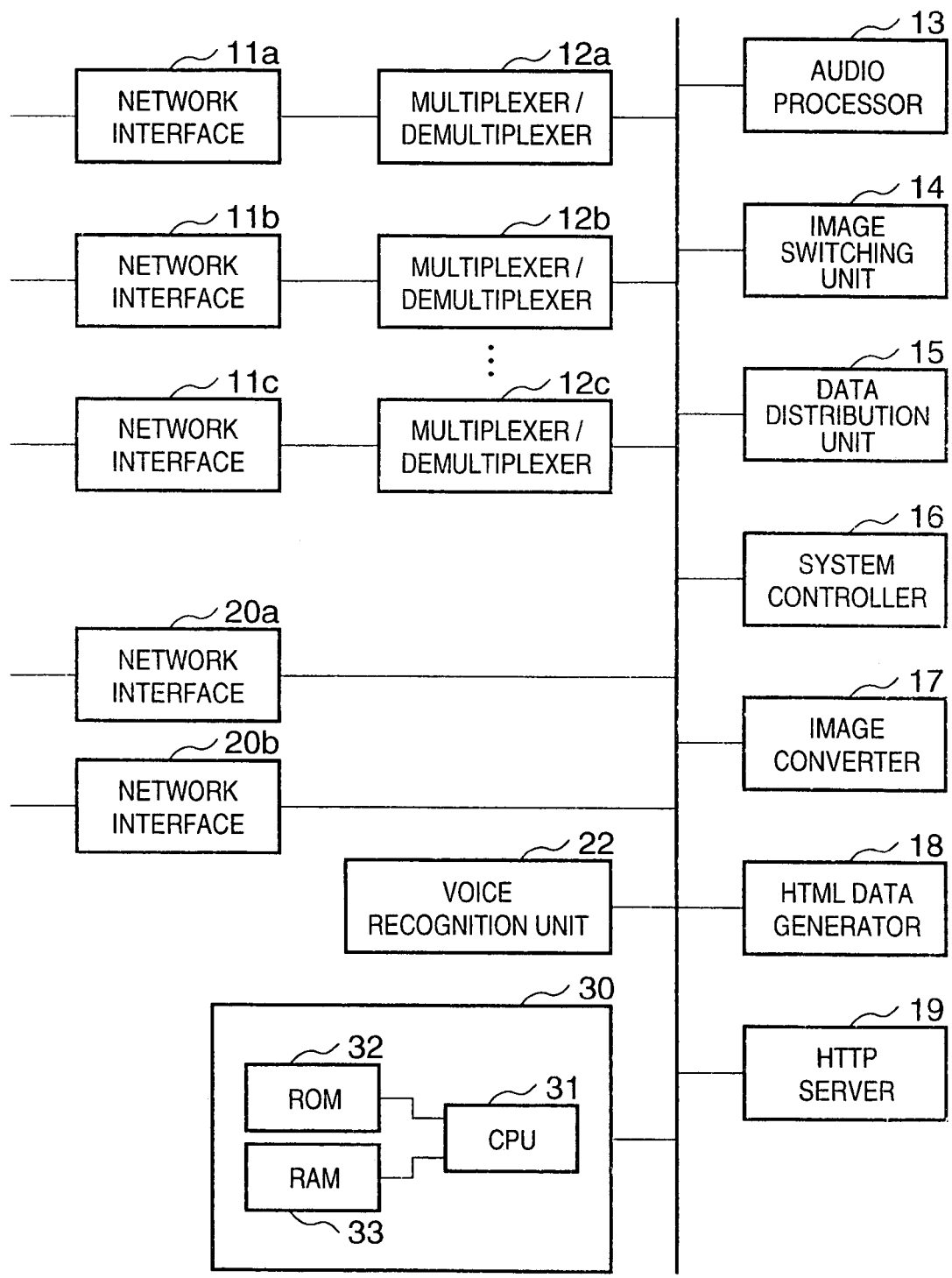
FIG. 4 is a block diagram showing the construction of a multipoint connection apparatus according to a second embodiment of the present invention.

FIG. 4 is block diagram showing the details of the multipoint connection apparatus 42 according to the second embodiment. Components in FIG. 4 identical with those of the first embodiment illustrated in FIG. 2 are designated by like reference characters and are not described again.

In FIG. 4, the audio processor 13 applies decoding/mixing processing to audio code data from the dedicated videoconferencing terminals 41a to 41d, thenceforth encodes the data again and distributes it to each of the dedicated videoconferencing terminals 41a to 41d and to a voice recognition unit 22. The latter subjects the audio data, which has been mixed by the audio processor 13, to recognition processing. The operation of the videoconferencing system according to the second embodiment will be described in detail with reference to the system configuration shown in FIG. 4. Operational aspects similar to those of the first embodiment need not be described in detail again.

Multiplexed multimedia data that has been sent to the multipoint connection apparatus 42 via the network interfaces 11a to 11c accommodating the dedicated videoconferencing terminals 41a to 41d is demultiplexed to audio code data, video code data and low-speed data for data conferencing by the multiplexer/demultiplexers 12a to 12c.

The demultiplexed audio code data is decoded by the audio processor 13 and mixed with data obtained by decoding other audio code data that has been demultiplexed by any of the multiplexer/demultiplexers 12a to 12c. The mixed audio code data is coded further, after which the resulting data is multiplexed with image data in the multiplexer/demultiplexers 12a to 12c and then distributed to the dedicated videoconferencing terminals 41a to 41d. At the same time, the audio data that has been mixed by the audio processor 13 is sent to the voice recognition unit 22.

The voice recognition unit 22 subjects the input audio data to recognition processing and converts the obtained results to text data. The text data generated is distributed to the general-purpose terminals 43a, 43b as text-chat data in a data conferencing function in compliance with T.120, by way of example. It should be noted that the data conferencing function mentioned here is one through which mutual communication of text-chat data is performed between the multipoint connection apparatus 42 and the general-purpose terminals 43a, 43b connected to the network interfaces 20a, 20b. Accordingly, text data that has entered from the general-purpose terminals 43a, 43b also is displayed in the text-chat window of the dedicated videoconferencing terminals 41a to 41d. The data distribution unit 15 supervises distribution processing relating to this data communication. Meanwhile, in a manner similar to that of the first embodiment, video code data that has been demultiplexed by the multiplexer/demultiplexers 12a to 12c is decoded by the image converter 17 and converted to HTML data by the HTML data generator 18 so that it can be viewed in the manner shown in FIG. 3. In FIG. 3, the window 53 for data conferencing compliant with T.120, etc., displays, in the form of text chat, text data obtained in the voice recognition unit 22 based upon voice data that has entered from the dedicated videoconferencing terminals 41a to 41d. An example of the text chat is the content of remarks made by participants at a conference.

The users of the general-purpose terminals 43a, 43b are capable of entering their own remarks at a conference in the form of text displayed in the window 53. Entered text data is distributed to the dedicated videoconferencing terminals 41a to 41d. More specifically, the users of the general-purpose terminals 43a, 43b are capable of mutual text-based communication with the users of the dedicated videoconferencing terminals 41a to 41d by way of the text-chat function.

Thus, in accordance with this embodiment, as described above, the user of a general-purpose terminal connected to a network interface via a network is capable of performing text-data-based mutual communication with a dedicated videoconferencing terminal by utilizing a text-chat function. Furthermore, video from a dedicated videoconferencing terminal can be viewed as a still picture by utilizing an HTML viewer. In addition, a personal computer or network computer having a comparatively handy functional architecture that does not include a multimedia function can be used as the general-purpose terminal for implementing the above-mentioned functions. As a result, participation in a multipoint videoconference from any location and from a transportable terminal is made easier.

Third Embodiment

A third embodiment according to the present invention will now be described.

Since the basic configuration of the videoconferencing system according to the third embodiment is similar to that shown in FIG. 1, which illustrates the first embodiment, it need not be described again here. The multipoint connection apparatus 42 according to the third embodiment has a voice synthesizing function in addition to the function for converting the content of remarks to text by the voice recognition mechanism described in the second embodiment.

Figure 5:
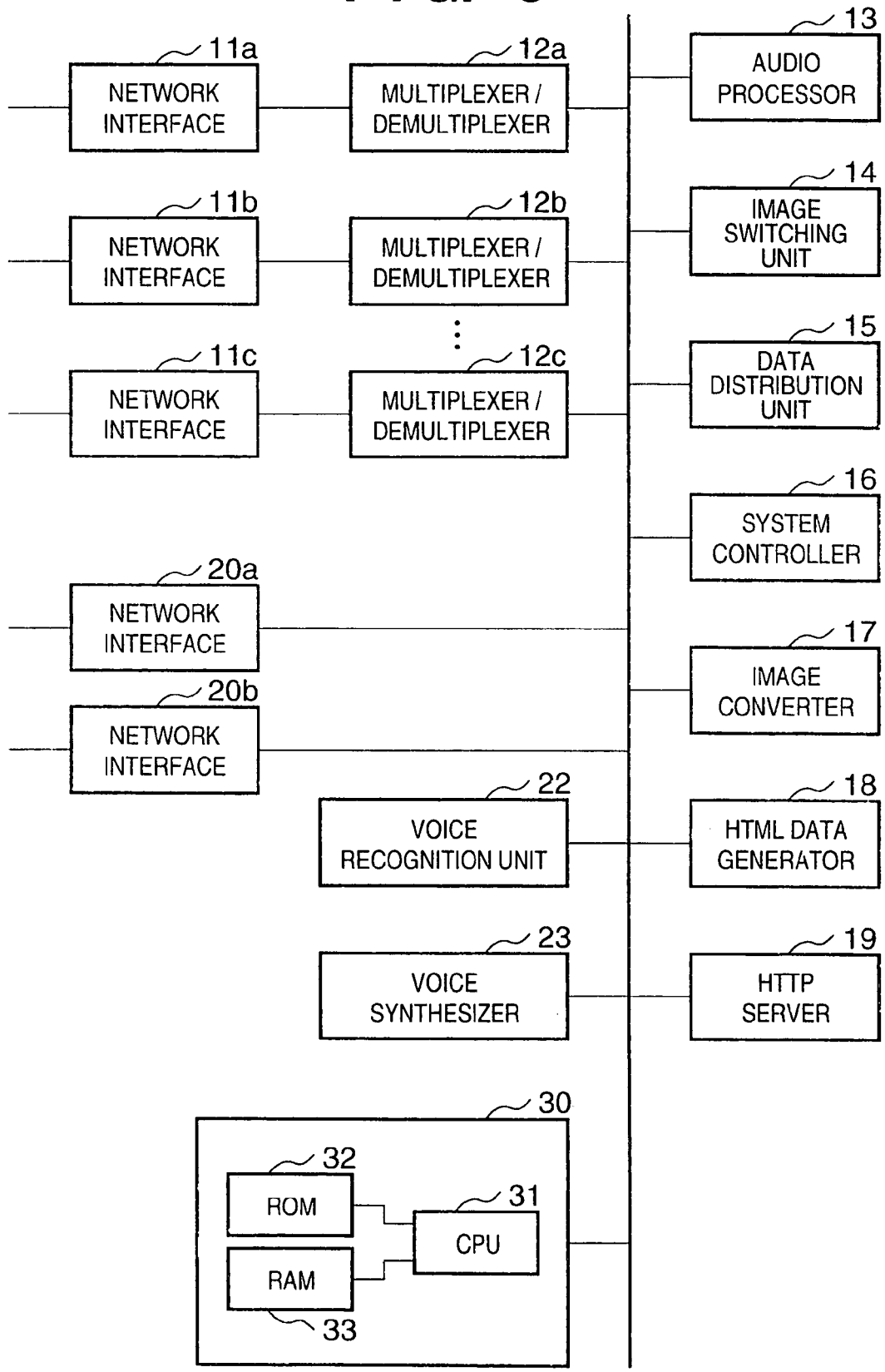
FIG. 5 is a block diagram showing the construction of a multipoint connection apparatus according to a third embodiment of the present invention.
Figure 6:
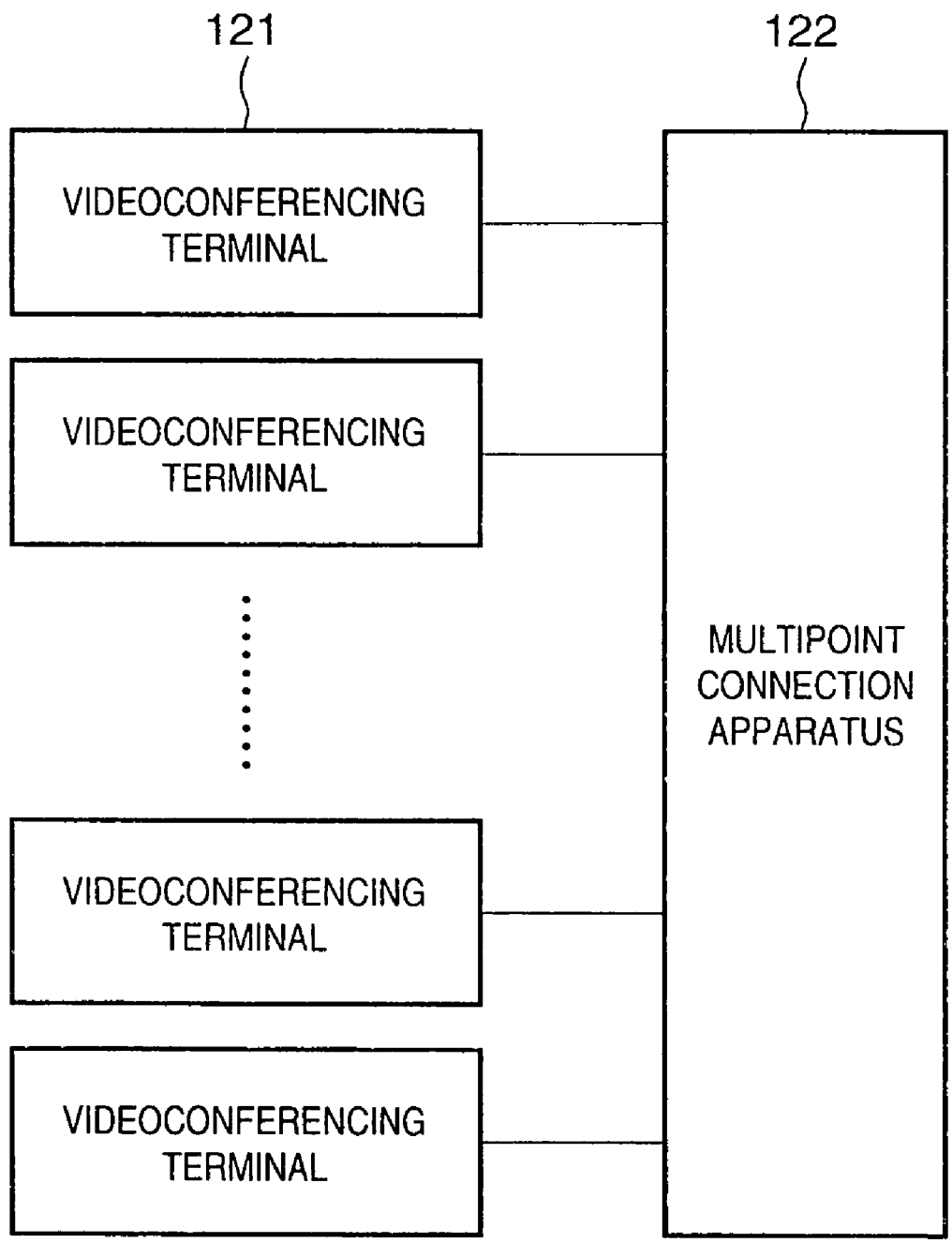
FIG. 6 is a block diagram illustrating a multipoint videoconferencing system according to the prior art.
Figure 7:
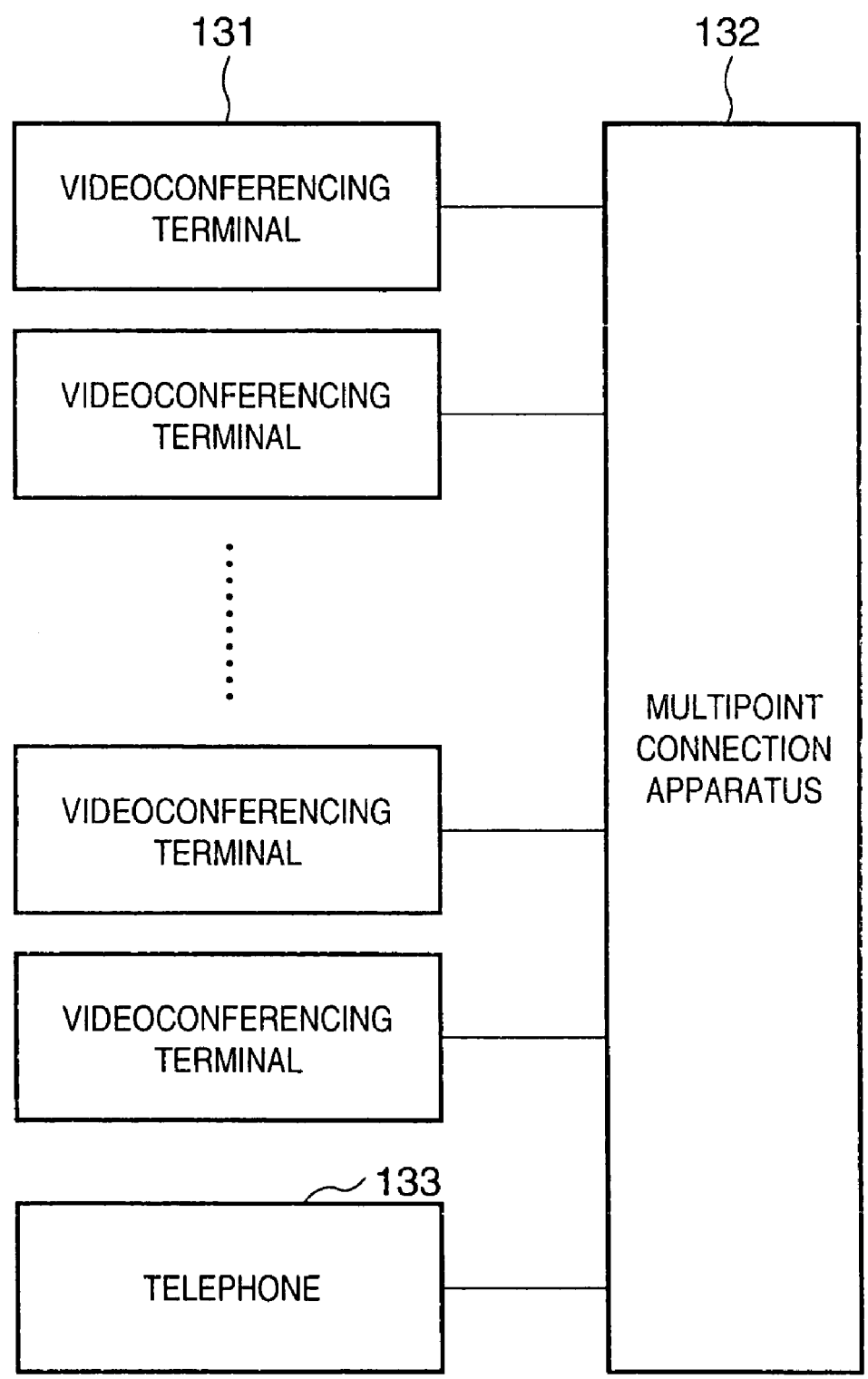
FIG. 7 is a block diagram showing the configuration of a multipoint videoconferencing system having a telephone-based gateway function according to the prior art.

FIG. 5 is block diagram showing the details of the multipoint connection apparatus 42 according to the third embodiment. Components in FIG. 5 identical with those of the second embodiment illustrated in FIG. 4 are designated by like reference characters and are not described again.

In FIG. 5, a voice synthesizer 23, the input to which is text data sent from the general-purpose terminals 43a, 43b connected to the network interfaces 20a, 20b, executes voice synthesizing processing for converting the content of the text data to voice data. The synthesized voice data is mixed by the audio processor 13 with voice data that has been sent from the dedicated videoconferencing terminals 41a to 41d and the resulting data is distributed to the appropriate dedicated videoconferencing terminals 41a to 41d again. As a result, text-chat data from conference participants using the general-purpose terminals 43a, 43b can be heard as voice information by the conference participants using the dedicated videoconferencing terminals 41a to 41d.

Thus, in accordance with the third embodiment, as described above, even if a dedicated videoconferencing terminal does not possess a data conferencing function such as a text-chat function, mutual communication with a general-purpose terminal connected to the videoconferencing system can be realized by synthesized voice.

In each of the embodiments described above, it is explained that still-picture generation in the image converter 17 is performed at an arbitrary timing. However, it is also possible to start the conversion processing in response to commands from the general-purpose terminals 43a, 43b, by way of example. In such case the users of the general-purpose terminals 43a, 43b select the image windows 52a to 52e updated on the HTML browser, and the image converter 17 starts the conversion of the image and re-generates the still-picture data in response to an image request signal that conforms to the selection made, whereby the window display is updated. By thus generating a still picture, which is displayed in a window, in accordance with a timing designated by a user, even the users that have connected from the general-purpose terminals 43a, 43b can share the necessary images in the course of a conference.

Further, in each of the foregoing embodiments, examples in which HTML and an HTTP server are used as the means of supplying image data to the general-purpose terminals 43a, 43b are described. However, the present invention is not limited to such an arrangement. Any method of supplying image data may be utilized so long as it is one through which hyperlinked multimedia data can be supplied.

Further, in regard to the voice communication protocol for voice communication with the general-purpose terminals 43a, 43b, any protocol may be used so long as it makes real-time communication possible.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A data communication control apparatus for communicating with a plurality of terminals, comprising:
    a receiving device adapted to receive image data and voice data, or text data from a first terminal;
    a voice recognition device adapted to recognize the voice data and to generate text data based upon the recognized voice data;
    an image file generating device adapted to generate an image file on the basis of the image data received by the receiving device;
    a control device adapted to control distribution of data corresponding to a kind of a second terminal; and
    a data distributing device adapted to distribute the generated text data generated by the voice recognition device and the generated image file generated by the image file generating device to the second terminal, if the receiving device receives image data and voice data from the first terminal and the second terminal can communicate via at least text data and an image file, to distribute the received text data received by the receiving device to the second terminal, if the receiving device receives text data from the first terminal and the second terminal can communicate via at least text data, or to distribute the received image data and voice data to the second terminal, if the receiving device receives image data and voice data from the first terminal and the second terminal can communicate via at least voice data and image data, by controlling a distribution method for distributing the data,
    wherein the data distributing device further distributes to the first terminal, if the receiving device receives voice data and image data from the first terminal and the first terminal can communicate via at least text data and can display both first text data and second text data on one window, where the first text data is the generated text data generated by the voice recognition device on the basis of the voice data received from the first terminal and the second text data is the generated text data generated by the voice recognition device on the basis of the voice data received from another terminal or is received text data received from another terminal.

2. The apparatus according to claim 1, wherein said data distributing device distributes the text data in real time.

3. The apparatus according to claim 1, wherein said data distributing device further distributes text data, which has been entered from the second terminal, to the first terminal.

4. The apparatus according to claim 1, wherein said voice recognition device generates text-chat data.

5. The apparatus according to claim 4, wherein said second terminal has a data conferencing function based upon text-chat data.

6. The apparatus according to claim 5, wherein the first terminal has a data conferencing function based upon text-chat data.

7. The apparatus according to claim 4, wherein the text-chat data is in compliance with ITU-T Recommendation T.120.

8. The apparatus according to claim 1, wherein the second terminal is connected via the Internet Protocol.

9. The apparatus according to claim 8, wherein said generated image file is HTML-format hypertext data for the second terminal, including the image data.

10. The apparatus according to claim 9, wherein said image file generating device includes an HTTP server.

11. The apparatus according to claim 1, wherein the first terminal is a videoconferencing terminal in compliance with any of ITU-T Recommendations H.0.320, H.323 and H.324.

12. The apparatus according to claim 11, wherein the data communication control apparatus is in compliance with ITU-T Recommendations H.231 and H.243.

13. The apparatus according to claim 1, further comprising a request device adapted to request the generation of a still image corresponding to a selected image window when the image window is selected out of image windows updated on the HTML browser.

14. A control method in a data communication control apparatus for communicating with a plurality of terminals, comprising the steps of:
  a receiving step of receiving image data and voice data, or text data from a first terminal;
  a voice recognition step of recognizing the voice data and to generate text data based upon the recognized voice data;
  an image file generating step of generating an image file on the basis of the image data received in said receiving step;
  a control step of controlling distribution of data corresponding to a kind of a second terminal; and
  a data distributing step of distributing the generated text data generated by the voice recognition device and the generated image file generated by the image file generating device to the second terminal, if in said receiving step image data and voice data are received from the first terminal and the second terminal can communicate via at least text data and an image file, of distributing the received text data received in said receiving step to the second terminal, if in said receiving step text data is received from the first terminal and the second terminal can communicate via at least text data, or of distributing the received image data and voice data to the second terminal, if in said receiving step image data and voice data are received from the first terminal and the second terminal can communicate via at least voice data and image data, by controlling the way of distributing data,
  wherein said data distribution step further includes distributing to the first terminal, if voice data and image data are received from the first terminal in said receiving step and the first terminal can communicate via at least text data and can display both first text data and second text data on one window, where the first text data is the generated text data generated in said voice recognition step on the basis of the voice data received from the first terminal and the second text data is the generated text data generated in said voice recognition step on the basis of the voice data received from another terminal or is received text data received from another terminal.

15. A computer readable recording medium on which has been recorded program code of a control method in a data communication control apparatus for communicating with a plurality of terminals, said program code comprising:
  code of a receiving step of receiving image data and voice data, or text data from a first terminal;
  code of a voice recognition step of recognizing the voice data and to generate text data based upon the recognized voice data;
  code of an image file generating step of generating an image file on the basis of the image data received in said receiving step;
  code of a control step of controlling distribution of data corresponding to a kind of a second terminal; and
  code of a data distributing step of distributing the generated text data generated by the voice recognition device and the generated image file generated by the image file generating device to the second terminal, if in said receiving step image data and voice data are received from the first terminal and the second terminal can communicate via at least text data and an image file, of distributing the received text data received in said receiving step to the second terminal, if in said receiving step text data is received from the first terminal and the second terminal can communicate via at least text data, or of distributing the received image data and voice data to the second terminal, if in said receiving step image data and voice data are received from the first terminal and the second terminal can communicate via at least voice data and image data, by controlling the way of distributing data,
  wherein said data distribution step further includes distributing to the first terminal, if voice data and image data are received from the first terminal in said receiving step and the first terminal can communicate via at least text data and can display both first text data and second text data on one window, where the first text data is the generated text data generated in said voice recognition step on the basis of the voice data received from the first terminal and the second text data is the generated text data generated in said voice recognition step on the basis of the voice data received from another terminal or is received text data received from another terminal.

* * * * *

UNITED STATES PATENT AND TRADEMARK OFFICE
CERTIFICATE OF CORRECTION

| | |
|---|---|
| PATENT NO. | : 7,039,675 B1 |
| APPLICATION NO. | : 09/343183 |
| DATED | : May 2, 2006 |
| INVENTOR(S) | : Masami Kato |

It is certified that error appears in the above-identified patent and that said Letters Patent is hereby corrected as shown below:

On The Title, Item (56):
References Cited, FOREIGN PATENT DOCUMENTS,
"05007356" should read -- 05-007356 --;
"09191455" should read -- 09-191455 --;
"09233444" should read -- 09-233444 --;
"10243389" should read -- 10-243389 --; and
"10257424" should read -- 10-257424 --.

COLUMN 3:
Line 26, "as" should read -- has --;
Line 45, "invention" should read -- invention. --; and
insert a paragraph break before "FIG. 1".

COLUMN 10:
Line 63, "H.0. 320," should read -- H.320, --.

Signed and Sealed this

Tenth Day of July, 2007

JON W. DUDAS
*Director of the United States Patent and Trademark Office*